(12) United States Patent
Gupta et al.

(10) Patent No.: US 11,238,379 B2
(45) Date of Patent: Feb. 1, 2022

(54) SYSTEMS AND METHODS FOR OPTIMIZING OIL PRODUCTION

(71) Applicant: Schlumberger Technology Corporation, Sugar Land, TX (US)

(72) Inventors: Supriya Gupta, Houston, TX (US); Satya Deepthi Gopisetti, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 101 days.

(21) Appl. No.: 16/615,956

(22) PCT Filed: May 22, 2018

(86) PCT No.: PCT/US2018/033789
§ 371 (c)(1),
(2) Date: Nov. 22, 2019

(87) PCT Pub. No.: WO2018/217686
PCT Pub. Date: Nov. 29, 2018

(65) Prior Publication Data
US 2020/0097864 A1    Mar. 26, 2020

Related U.S. Application Data

(60) Provisional application No. 62/510,198, filed on May 23, 2017.

(51) Int. Cl.
*G06Q 10/04* (2012.01)
*G06Q 50/06* (2012.01)

(52) U.S. Cl.
CPC .............. *G06Q 10/04* (2013.01); *G06Q 50/06* (2013.01)

(58) Field of Classification Search
CPC ............................. G06Q 10/04; G06Q 50/06
See application file for complete search history.

(56) References Cited

U.S. PATENT DOCUMENTS

| | | | |
|---|---|---|---|
| 2007/0016389 A1 | 1/2007 | Ozgen | |
| 2009/0020284 A1* | 1/2009 | Graf | E21B 44/00 166/250.15 |

(Continued)

FOREIGN PATENT DOCUMENTS

KR    10-1657890 B1    9/2016

OTHER PUBLICATIONS

Malakooti, R. "Novel Methods for Active Reservoir Monitoring and Flow Rate Allocation of Intelligent Wells" [Thesis] School of Energy, Geoscience, Infrastructure and Society; Heriot-Watt University [retrieved on Jul. 3, 2021] (Year: 2015).*

(Continued)

*Primary Examiner* — Rehana Perveen
*Assistant Examiner* — Alfred H B Wechselberger
(74) *Attorney, Agent, or Firm* — Michael Guthrie

(57) ABSTRACT

A method for optimizing oil production includes receiving historical production data for one or more wells. A first model is generated based at least partially upon the historical production data. The production in the one or more wells is predicted based at least partially upon the first model. A second model is generated based at least partially on the predicted production. A production allocation is determined in the one or more wells to maximize production based at least partially upon the second model. The production allocation is then implemented.

18 Claims, 8 Drawing Sheets

(56) References Cited

U.S. PATENT DOCUMENTS

| | | | | |
|---|---|---|---|---|
| 2011/0119037 | A1* | 5/2011 | Rashid | E21B 43/12 703/2 |
| 2012/0215512 | A1 | 8/2012 | Sarma | |
| 2014/0039795 | A1 | 2/2014 | Temizel | |
| 2015/0134620 | A1 | 5/2015 | Crafton | |
| 2016/0010444 | A1* | 1/2016 | AlQahtani | E21B 41/00 703/10 |
| 2016/0280983 | A1* | 9/2016 | Zamora | C09K 8/514 |
| 2016/0312607 | A1 | 10/2016 | McNealy et al. | |
| 2016/0356125 | A1* | 12/2016 | Bello | G06Q 10/067 |
| 2017/0114617 | A1* | 4/2017 | Fulford | E21B 41/0092 |

OTHER PUBLICATIONS

Naus et al. "Optimization of Commingled Production using Infinitely Variable Inflow Control Valves" SPE90959, SPE Annual Technical Conference and Exhibition, Houston, Texas [retrieved on Jul. 6, 2021] (Year: 2004).*

Subrahmanya et al. "Robust Derivative Estimation for Decline Analysis from Noisy Production Data" SPE-181079-MS, SPE Intelligent Energy International Conference and Exhibition, Aberdeen, United Kingdom [retrieved on Aug. 10, 201] (Year: 2016).*

Al-Thuwaini et al. "Simulation and Optimization of Complex Architecture Wells With Smart Completions" OTC 20131, 2009 Offshore Technology Conference, Houston, Texas [retrieved on Aug. 10, 2021] (Year: 2009).*

Stoisits et al. "Gas Optimization at the Kuparuk River Field" SPE 28467, SPE 69th Annual Technical Conference and Exhibition, New Orleans, LA [retrieved on Jul. 6, 2021] (Year: 1994).*

Graf et al. "A Rigorous Well Model to Optimize Production From Intelligent Wells and Establish the Back-Allocation Algorithm" SPE 99994, SPE Europec/EAGE Annual Conference and Exhibition, Vienna, Austria [retrieved on Jul. 6, 2021] (Year: 2006).*

Van Essen et al. "Robust Waterflooding Optimization of Multiple Geological Scenarios" SPE 102913, SPE Annual Technical Conference and Exhibition, San Antonio, Texas [retrieved on Jul. 5, 2021] (Year: 2009).*

International Preliminary Report on Patentability for the counterpart International patent application PCT/US2018/033789 dated Dec. 5, 2019.

Extended European search report dated Oct. 9, 2020 in corresponding European Patent Application No. 18806166.7, 8 pages.

International Search Report and Written Opinion for the cross referenced International patent application PCT/US2018/033789 dated Nov. 16, 2018.

* cited by examiner

SYSTEMS AND METHODS FOR OPTIMIZING OIL PRODUCTION

CROSS-REFERENCE TO RELATED APPLICATIONS

This application claims priority to U.S. Provisional Patent Application No. 62/510,198, which was filed on May 23, 2017, the entirety of which is incorporated by reference herein.

BACKGROUND

As oil and gas companies continue deal with volatility in oil prices, production optimization and maintenance play a role in driving operations for the industry while maintaining acceptable profit margins. They focus on reducing the cost-per-barrel to survive the volatile oil prices. This may involve reducing the operating costs, increasing the uptime, and increasing the number of barrels produced.

SUMMARY

A method for optimizing oil production is disclosed. The method includes receiving historical production data for one or more wells. A first model is generated based at least partially upon the historical production data. The production in the one or more wells is predicted based at least partially upon the first model. A second model is generated based at least partially on the predicted production. A production allocation is determined in the one or more wells to maximize production based at least partially upon the second model. The production allocation is then implemented.

A computing system is also disclosed. The computing system includes one or more processors a memory system. The memory system includes one or more non-transitory computer-readable media storing instructions that, when executed by at least one of the one or more processors, cause the computer system to perform operations. The operations include receiving historical production data for one or more wells. A first model is generated based at least partially upon the historical production data. A curve based is generated at least partially upon the first model, wherein the curve corresponds to the historical production data. One or more data points in the historical production data that are outliers with respect to the curve are identified and removed. An uncertainty of the historical production data is determined based at least partially upon the first model after the one or more data points are removed. Production in the one or more wells is predicted based at least partially upon the first model and the uncertainty of the historical production data. An uncertainty of the predicted production is determined based at least partially upon the predicted production and the uncertainty of the historical production. A second model is generated based at least partially on the predicted production and the uncertainty of the predicted production. A production allocation is determined in the one or more wells to maximize production based at least partially upon the second model. The production allocation is then implemented.

A non-transitory computer-readable media is also disclosed. The media stores instructions that, when executed by one or more processors of a computer system, cause the computer system to perform operations. The operations include receiving historical production data for one or more wells. A first model is generated based at least partially upon the historical production data. A curve is generated based at least partially upon the first model. The curve corresponds to the historical production data. One or more data points in the historical production data that are outliers with respect to the curve are identified and removed. An uncertainty of the historical production data is determined based at least partially upon the first model after the one or more data points are removed. Production in the one or more wells is predicted based at least partially upon the first model and the uncertainty of the historical production data. An uncertainty of the predicted production is determined based at least partially upon the predicted production and the uncertainty of the historical production. A second model is generated based at least partially on the predicted production and the uncertainty of the predicted production. A production allocation is determined in the one or more wells to maximize production based at least partially upon the second model. The production allocation is then implemented.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
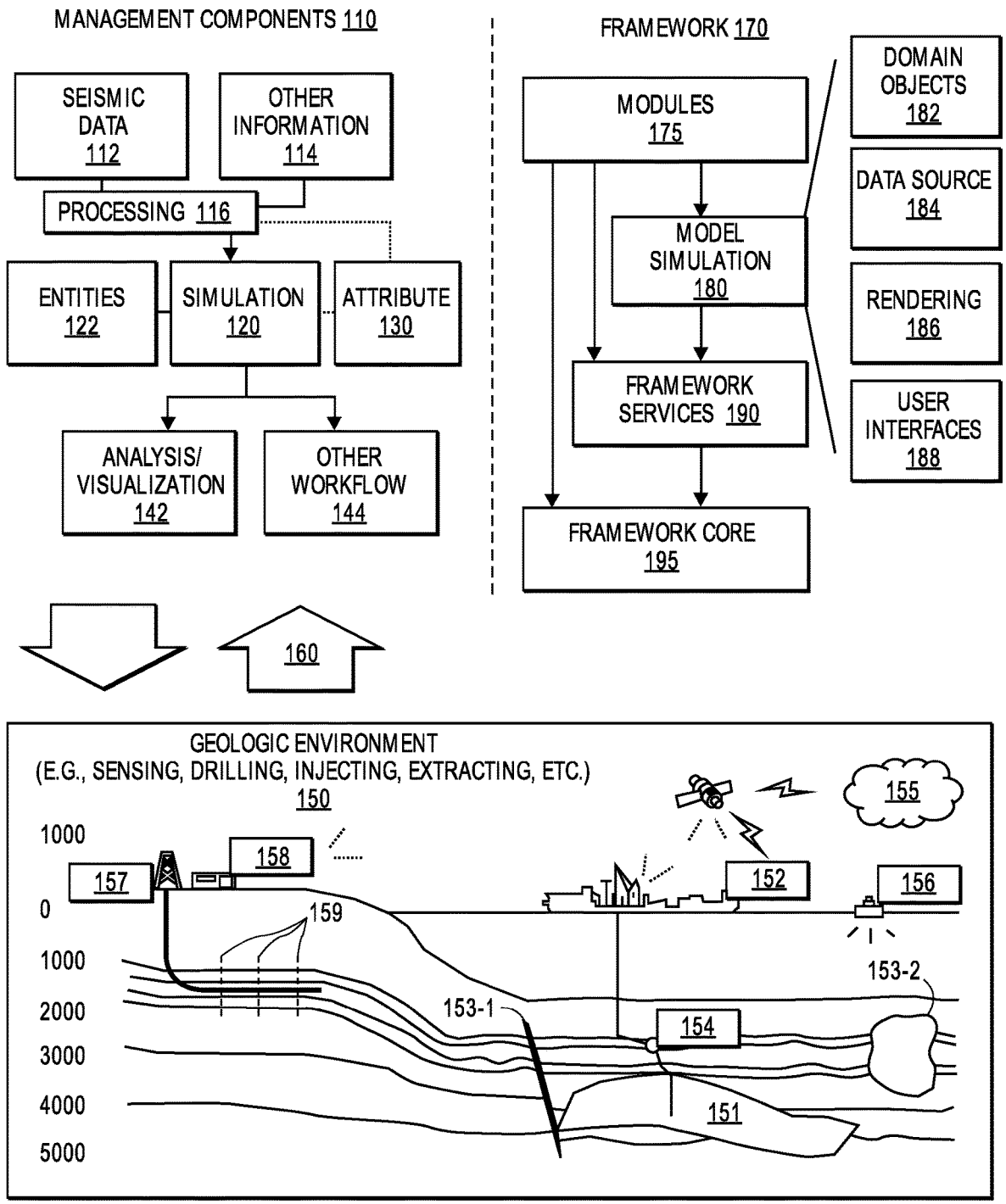
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE' reservoir simulator (Schlumberger Limited, Houston Tex.), the INTERSECT' reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations.

The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Embodiments of the system and method disclosed herein integrate exposed analogue models (e.g., into PETREL®) with other types of input data (e.g., seismic and well logs), while adding confidence and reducing uncertainty. As described in greater detail below, the system and method include automated and quantitative analysis of exposed analogues; automated geostatistical analysis of the reservoir properties; sedimentary forward modelling; synthetic seismic generation and matching to subsurface seismic data; and training data generation for subsurface interpretation constrained by geological rules derived from analogues. The resulting reservoir model is then the input for fluid flow simulation technologies. The optimal integration of multi-type datasets may improve the knowledge transfer from ground to sub-surface, increasing the efficiency and consistency in modeling complex reservoirs to ultimately reduce exploration risks and improve reservoir management.

The present disclosure includes an intelligent self-learning system and method that transform the way both conventional and unconventional assets are managed and production operations are optimized. As used herein, "assets" refers to oil fields including one or more producing wells. The system and method may model the data that flows through different functional workflows and hybridize engineering models through an artificial intelligence (AI) system incorporating machine learning techniques to learn patterns in the data and find opportunities through which the efficiency and effectiveness can be improved in production operations. This may also speed up actions and decision making processes.

The system may include a robust forecasting engine enabling a user to accurately report data to the Securities and Exchange Commission (SEC) to reduce a production engineer's analysis time to 0.001% of what it is today. The system may also include an intuitive framework that seamlessly integrates subsurface and production solutions. The system may also incorporate user feedback and enable proactive risk assessment. The system may also process and understand well potential and introduce visibility into drivers of well performance.

Figure 2:
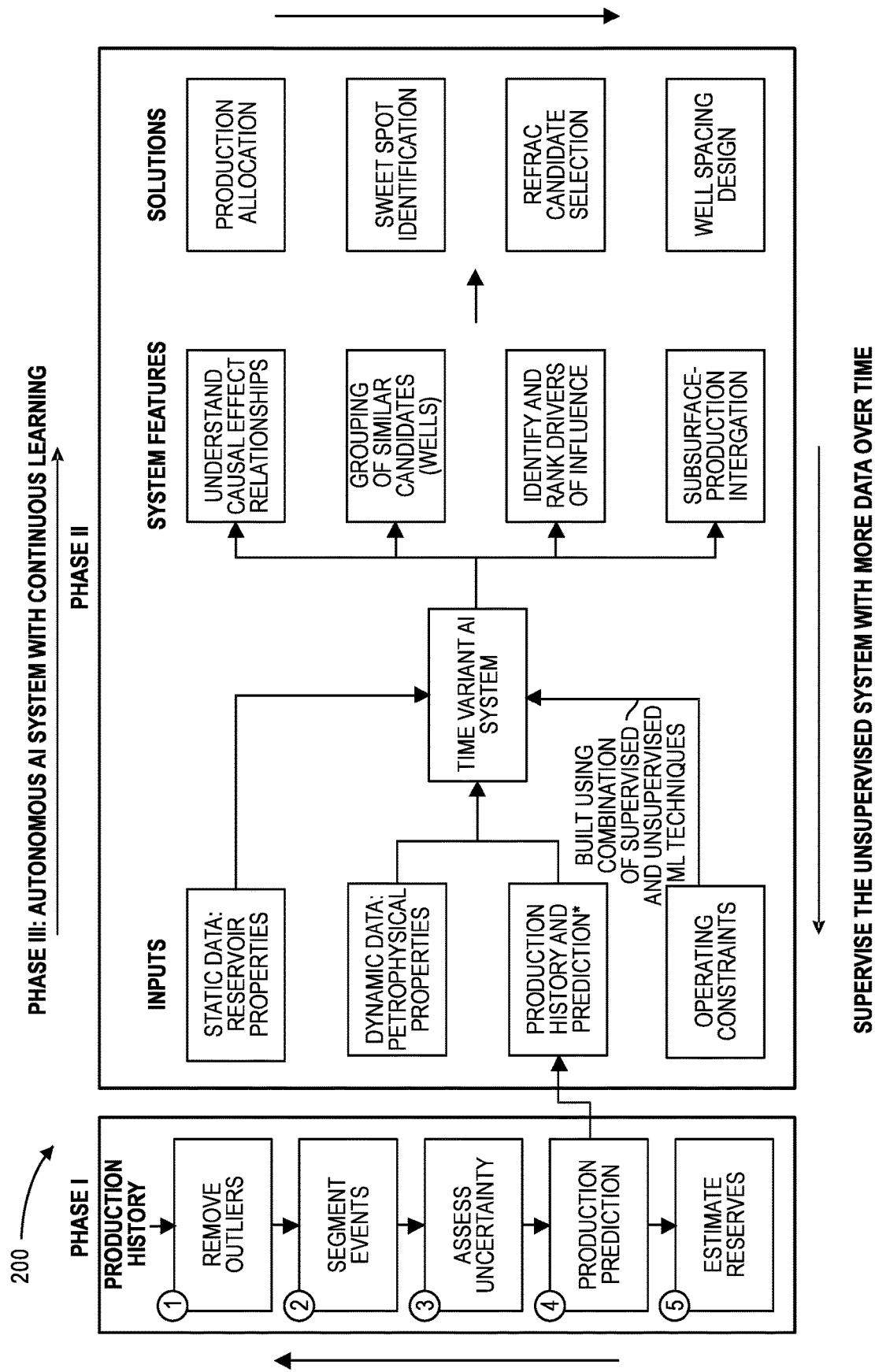
FIG. 2 illustrates schematic view of a workflow including three phases for optimizing oil production, according to an embodiment.

FIG. 2 illustrates schematic view of a workflow 200 including three phases, according to an embodiment. The three phases are discussed in detail below.

Phase 1—Automated Forecasting Engine

The automated forecasting engine may be an unbiased engine that provides automated forecasts for production data. Analyzing well performance at a point in time in the future may be used to facilitate decision-making about production potential. The production potential can be calculated using forecasting.

Figure 3A:
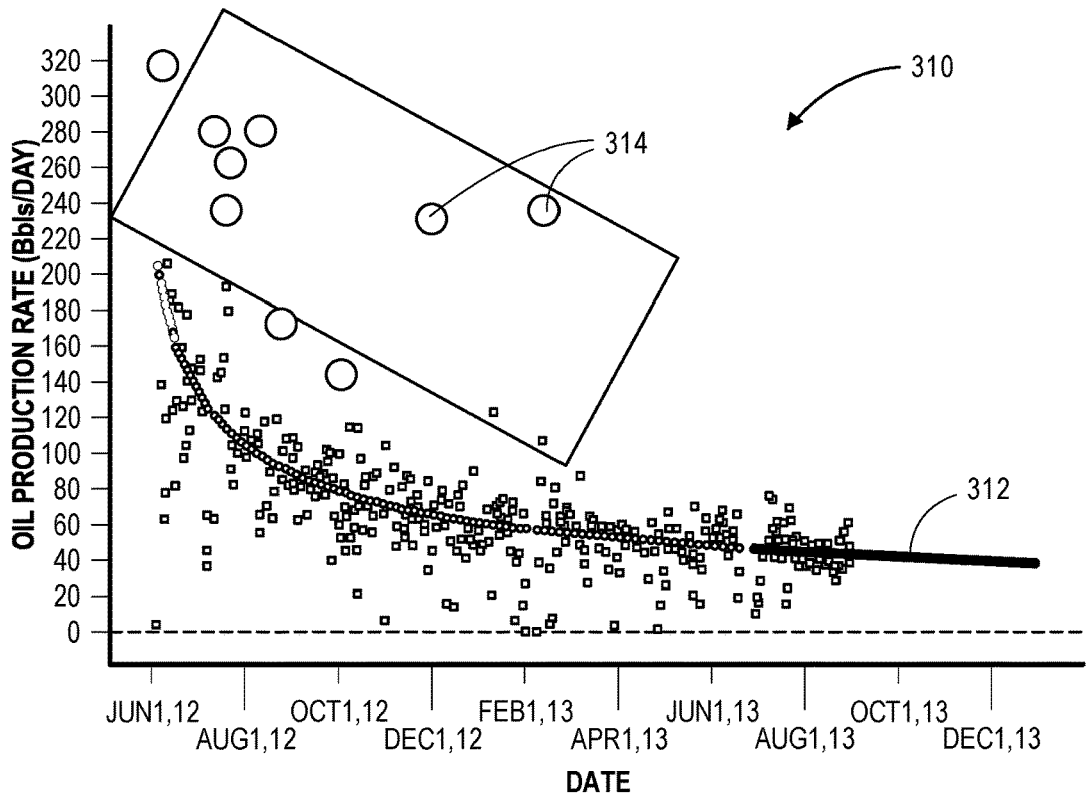
FIG. 3A illustrates a graph showing outliers in historical production data, which may be part of the first phase of the workflow, according to an embodiment.

The automated forecasting may include receiving data. The data may be or include historical production data (e.g., oil/gas production per unit time). The automated forecasting may include preprocessing the historical production data (e.g., data cleaning, removal of outliers, etc.). For example, FIG. 3A illustrates a graph 310 of the historical production data showing a plurality of outliers, according to an embodiment. More particularly, the graph 310 shows time on the X-axis and production on the Y-axis, so that the production (e.g., number of barrels) per unit time (e.g., day, week, month, etc.) can be monitored. As may be seen, a curve 312 may be generated that closely approximates most of the data points on the graph 310. However, some of the data points 314 are more than a predetermined distance away from the curve 312, making them outliers. These outliers 314 may be identified and removed from the data.

Figure 3B:
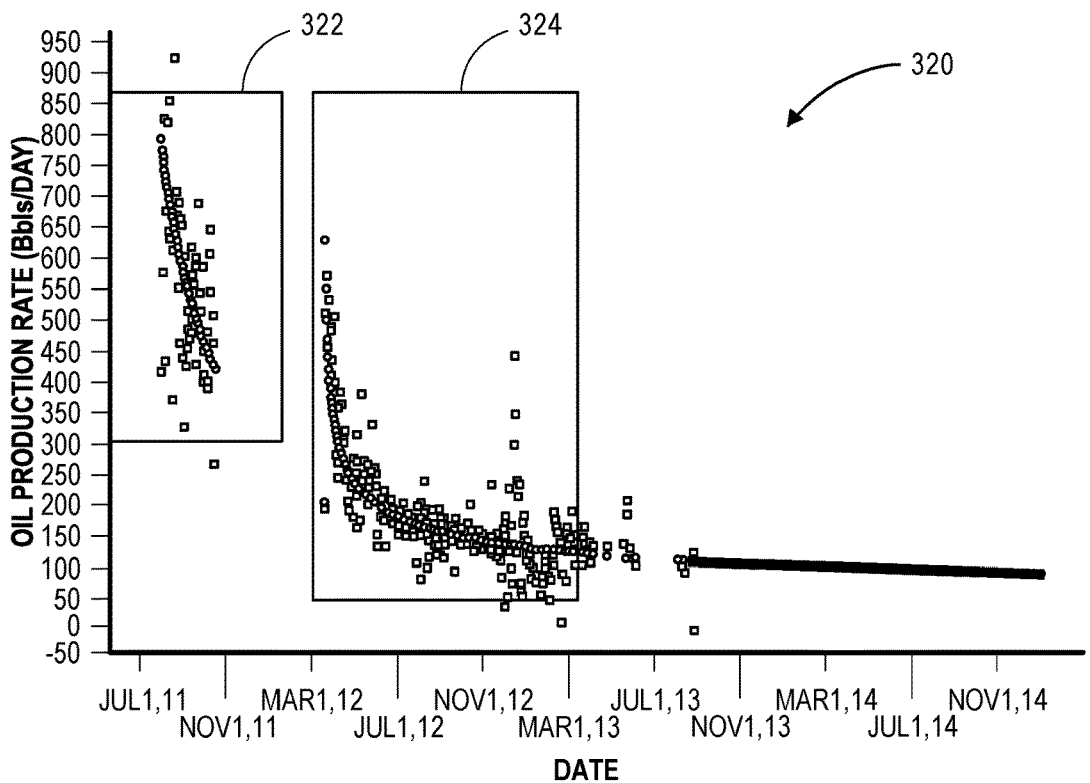
FIG. 3B illustrates a graph showing the historical production data being segmented based upon different events, which may be part of the first phase of the workflow, according to an embodiment.

The automated forecasting may also include event segmentation. More particularly, events, such as workovers, may be performed on producing wells from time to time. As used herein, a workover may be or include the repair or stimulation of an existing production well for the purpose of restoring, prolonging, or enhancing the production of hydrocarbons (i.e., oil and/or gas). A workover may include performing maintenance or remedial treatments on the well, such as the removal and replacement of the production tubing string after the well has been killed and a workover rig has been placed on location. The events may impact production in the past and/or future. The events are considered and modeled as part of the forecasting workflow. FIG. 3B illustrates a graph 320 showing event segmentation of the historical production data (e.g., after the outliers 314 have been removed), according to an embodiment. The graph 320 shows a first event 322 and a second event 324. In an example, the first event 322 may be or include a decline happening in an unconventional well when it started producing that may cause the production to fall off dramatically, and the second event 324 may be or include a workover performed on the well that may cause the production to increase again.

The automated forecasting may also include generating a forecast model. Bayesian modelling may be used to build a forecast model using the data (e.g., in graphs 310, 320). A forecast is then generated using the model parameters.

Figure 3C:
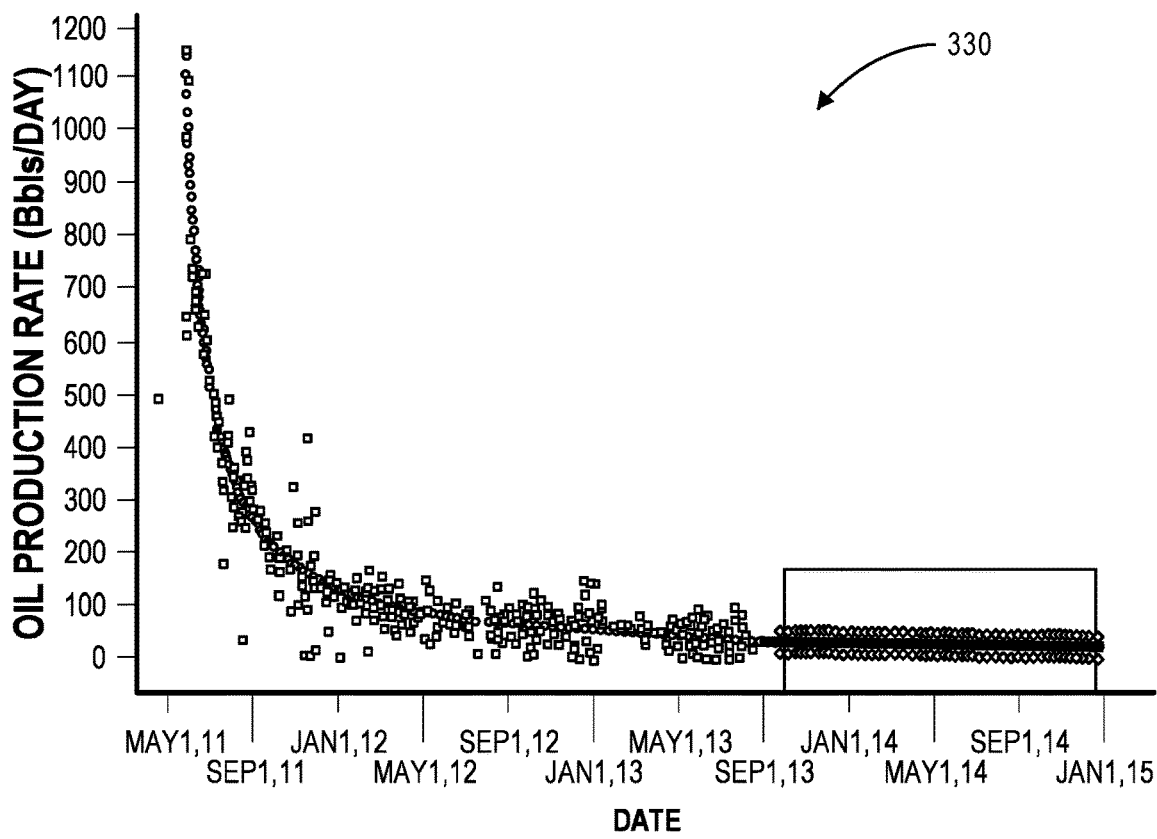
FIG. 3C illustrates a graph showing an uncertainty quantification of the production forecast, which may be part of the first phase of the workflow, according to an embodiment.

The automated forecasting may also include generating an uncertainty assessment. There is uncertainty associated with any forecast (i.e., prediction). The uncertainty is modeled using the forecast model and a variance of the input data. FIG. 3C illustrates a graph 330 showing uncertainty quantification of the production forecast, according to an embodiment. The uncertainty assessment provides confidence bands ($10^{th}$ percentile and $90^{th}$ percentile) within which 80% of the production prediction may lie in the future.

Figure 3D:
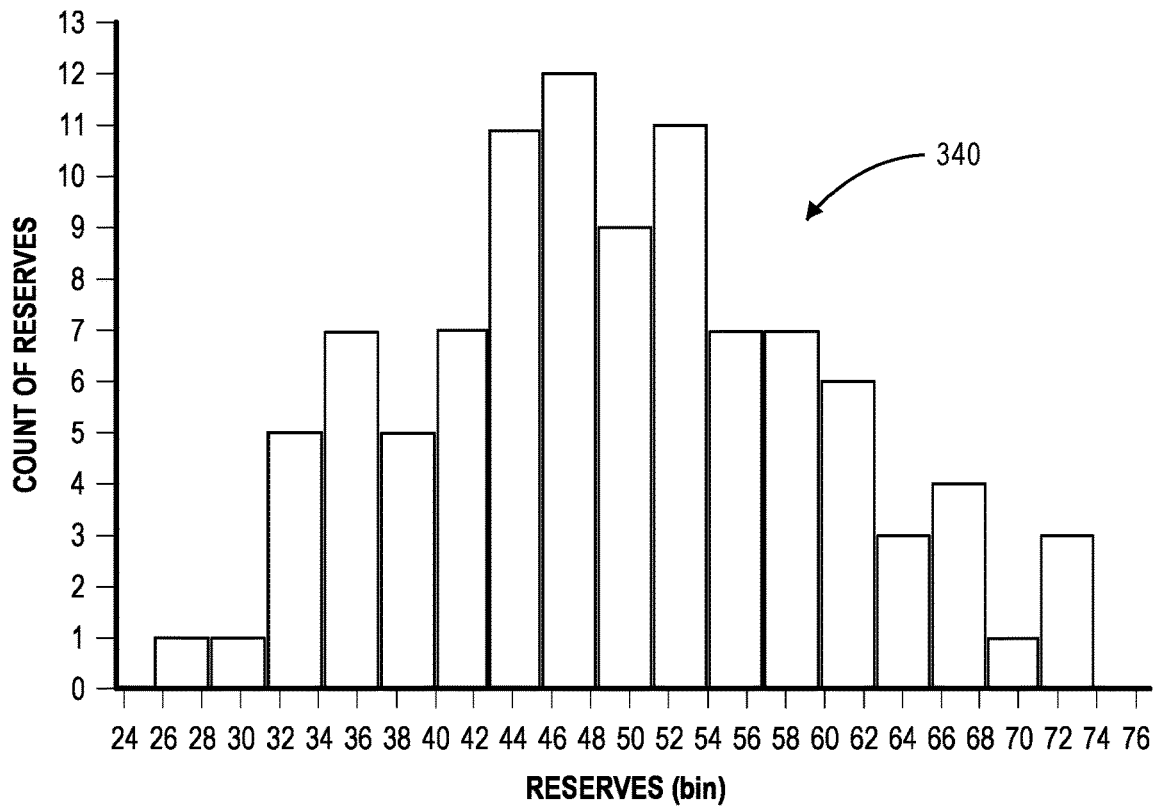
FIG. 3D illustrates a graph showing accumulated production, from which reserves may be estimated, which may be part of the first phase of the workflow, according to an embodiment.

FIG. 3D illustrates a graph 340 (e.g., a histogram) showing the accumulated production that may be used to estimate the estimated ultimate recovery (EUR) and reserves in the subterranean formation, according to an embodiment. Once the forecasts are generated, EUR and reserves may be estimated. Since there is uncertainty about the forecast, there is uncertainty associated with EUR and reserves as well. As such, a distribution (e.g., histogram) may be used to explain the EUR instead of a single value. The outcome of this phase is an automated forecasting engine that provides automated forecasts for production data. Users of this engine can generate an unbiased estimate of their production potential, which helps them with their SEC reserves reporting and company valuation.

Phase 2: Integrate Subsurface Data and Production Data Through a Statistical Framework This phase may include an intuitive statistical framework that stitches subsurface data to the (e.g., historical) production data. The intuitive engine may predict events (e.g., workovers), suggest workover upside, rank drivers of well performance, cluster similar wells and entities of interest to an asset manager, and investigate what-if scenarios. These automated operations may help production engineers proactively address risks in real-time production operations. The engine may assimilate different sources of data such as static data (e.g., reservoir properties), dynamic data (e.g., petrophysical properties), operating constraints (e.g., client-specific constraints), and the production history and prediction generated from phase 1. These sources of data may be used to model causal-effect relationships, group similar candidates, and identify and rank drivers of influence and subsurface-production integration. In this phase, the system may begin with unsupervised predictions, but feedback may be used so that the models can train themselves and become more robust over time.

Figure 4A:
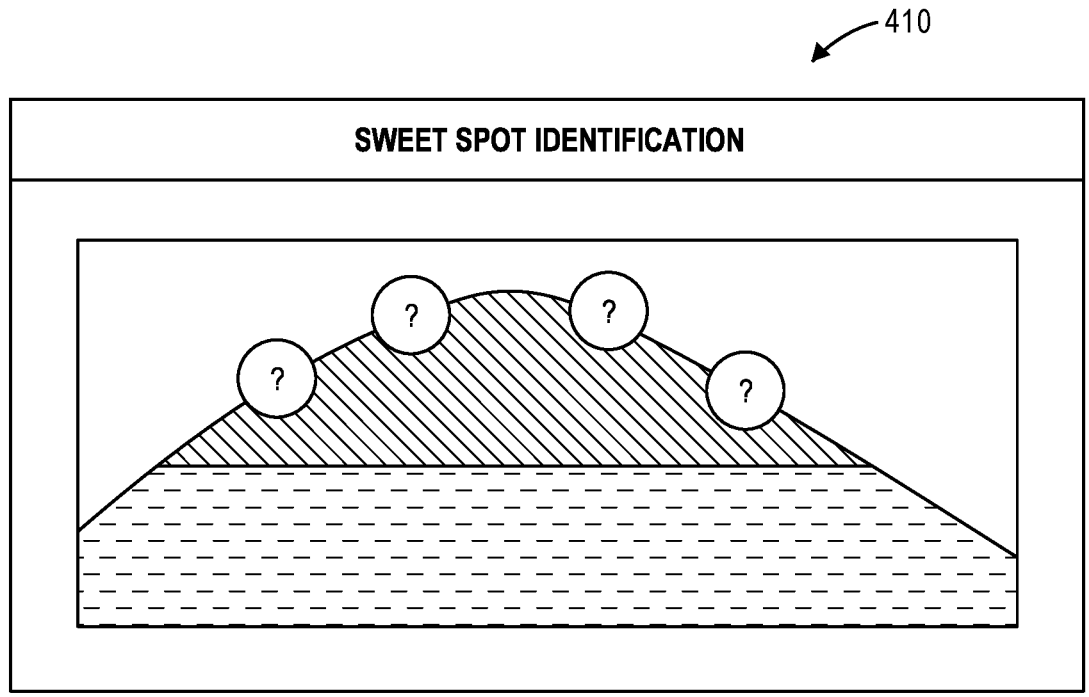
FIG. 4A illustrates a schematic view of a subterranean formation showing the identification of a sweet spot, which may be part of the second phase of the workflow, according to an embodiment.

The models for these features may help solve actual problems in the real-time production world. In one example, the models may be used for sweet spot identification. As used herein, the "sweet spot" refers to a target location or volume within a reservoir that represents the best production or potential production. FIG. 4A illustrates a graph 410 showing sweet spot identification in the subterranean formation, according to an embodiment. The wells may be aggregated. Then, fertile zones may be identified from the production history data. As shown, the zone 412 is fertile (e.g., oil and/or gas), and the zone 414 is not fertile (e.g., water). Then, the machine-learning model may be applied. From this, zones with maximum drainage area(s) may be determined. In response to this, the sweet spot(s) 412 in the subterranean formation may be identified.

Figure 4B:
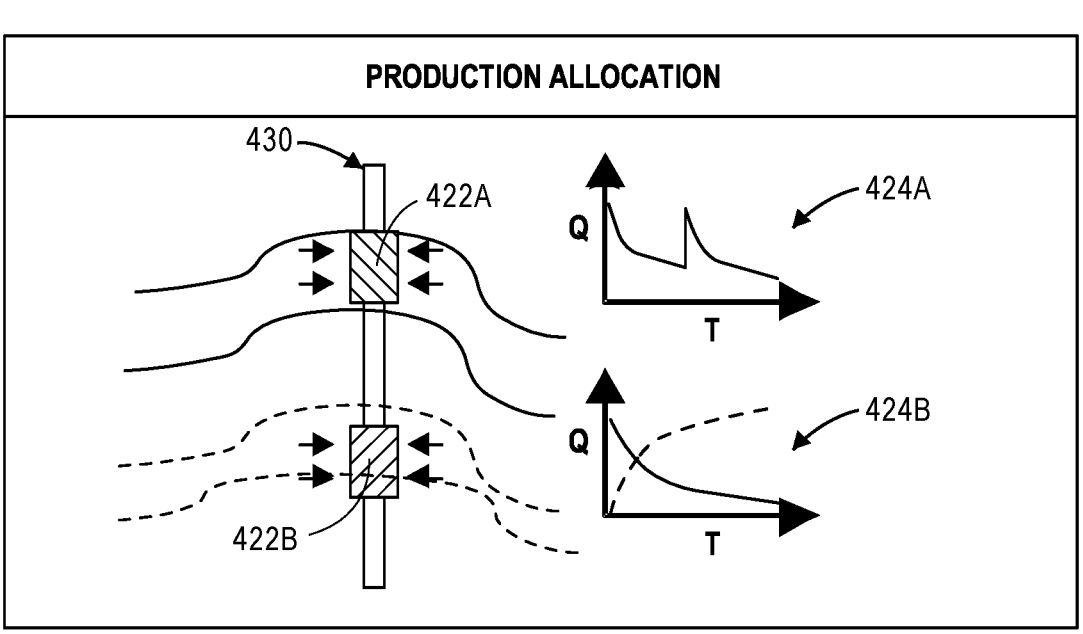
FIG. 4B illustrates production allocation between different stages in a well, which may be part of the second phase of the workflow, according to an embodiment.

In another example, the models may be used to determine production allocation. FIG. 4B illustrates production allocation between different stages 422A, 422B a well 420, to an embodiment. As shown, the first (e.g., upper) stage 422A may be in fluid communication with oil/gas, and the second (e.g., lower) stage 422B may be in fluid communication with an aquifer (e.g., water). The graph 424A shows the production of oil/gas if the first stage 422A produces. The graph 424B shows the production of oil/gas and water if the first and second stages 422A, 422B produce. As may be seen, allocating production between both the first and second stages 422A, 422B may reduce the amount of oil/gas that is produced/recovered. Thus, the user may decide to produce from the first stage 422A but not the second stage 422B.

In at least one embodiment, the production may be back-allocated. This may include reviewing the production history, finding events of interest, and mapping the events to static and/or dynamic data. Then, one or more zones of interest may be identified (e.g., proximate to the first stage 422A). The machine-learning model may then be applied to the zone(s) of interest. A workover may be planned using results of the model.

Figure 4C:
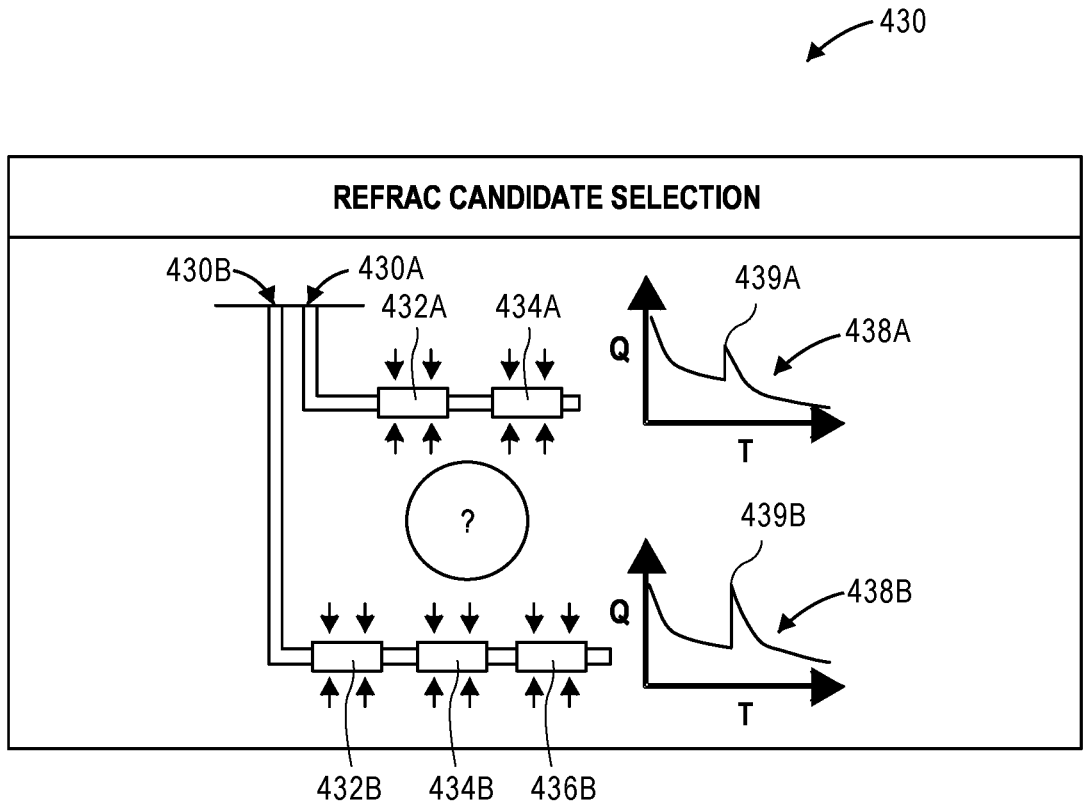
FIG. 4C illustrates a schematic view of one or more wells that are candidates to be re-fractured, which may be part of the second phase of the workflow, according to an embodiment.

In another example, the models may be used to select which stages and/or wells may benefit from being re-fractured. FIG. 4C illustrates a schematic view of two wells 430A, 430B that are candidates for re-fracturing, according to an embodiment. The first well 430A may include two stages 432A, 434A, and the second well 430B may include three stages 432B, 434B, 436B. The machine-learning model may be applied to analyze the production potential at one or more of the stages 432A, 434A, 432B, 434B, 436B. The graph 438A shows the production potential for the first well 430A if one or more of the stages 432A, 434A is re-fractured, and the graph 438B shows the production potential for the second well 430B if one or more of the stages 432B, 434B, 436B is re-fractured. As shown, the first graph 438A may have a smaller spike 439A, and the second graph 438B may have a larger spike 439B. The spikes 438A, 438B may indicate increased production (e.g., in response to re-fracturing). Thus, from this, the user may determine that it may be beneficial to re-fracture the first well 430A, but it may be even more beneficial to fracture the second well 430B. The model may calculate the production potential of the zones of interest and use the information about oil produced during one or more fracking cycles to determine the potential producibility of each stage during re-fracking.

Figure 4D:
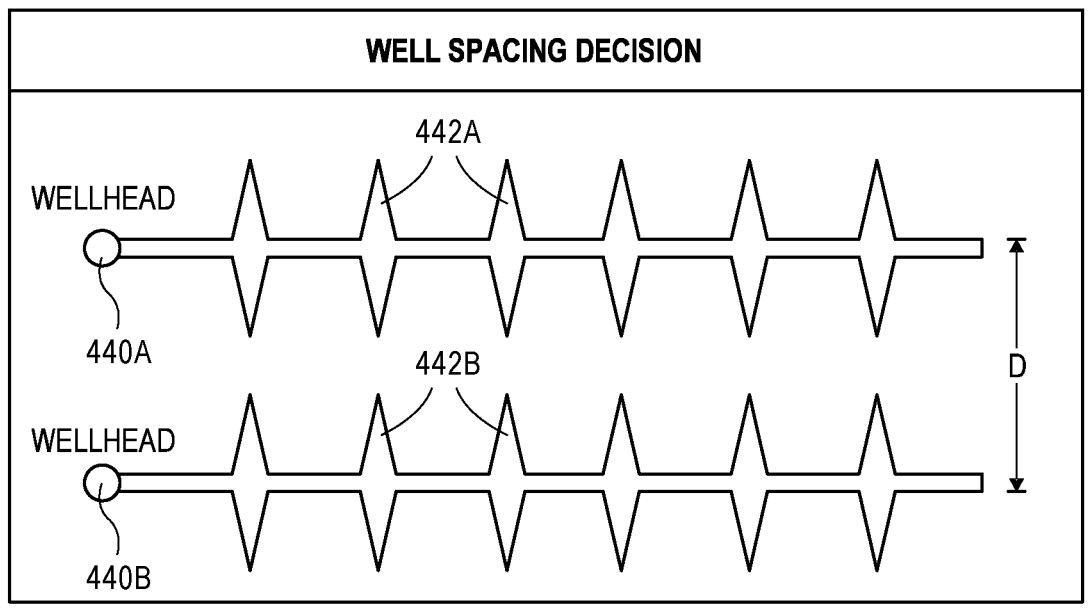
FIG. 4D illustrates a top view of two wells spaced laterally apart from one another, which may be part of the second phase of the workflow, according to an embodiment.

In yet another example, the models may be used to design well spacing. FIG. 4D illustrates a top view of two wells 440A, 440B spaced laterally apart from one another, according to an embodiment. The wells 440A, 440B may be aggregated. Each well 440A, 440B may have one or more stages 442A, 442B. Fertile zones may be identified from the production history. Then, the machine-learning model may be applied. Then, a well location for a new well may be suggested.

Phase 3: Autonomous Oilfield Advisor

As the system is trained intelligently over time, it may evolve from being an unsupervised system to a supervised system. With that, the user may be able to identify clusters of wells. In an example, one cluster may have wells that are similar based on features derived from rock properties, and another cluster may have wells that are similar based on production signatures. This can help speed up actions or decisions. In addition, to reduce unit cost/barrel and to keep wells healthy and running longer, workovers may be reduced, thereby reducing downtime. Currently, there is a lot of dependency on engineers, field personnel, lease operators, and foremen to accomplish this. They rely on their intuition and their experience, but there is a bias that comes with it, which may translate into remedial actions that may or may not be helpful. The system and method disclosed herein may study the features of the ML engine over time to identify candidates for workovers. The system and method may help manage by exception, and intervene when there is a problem. The system and method may not suggest a workover just because the production seems to have declined when it may be just a natural decline. Rather, the system and method may selectively intervene when a predetermined threshold is reached. Further, the same learning can be applied to wells with artificial lifts to proactively predict and prevent an impending failure from occurring and prescribe a remedial action. In this manner, the system and method can keep wells healthy and running for longer and act as an advisor for optimizing production operations. By the third phase, it may mimic the brain, intuition, and over time, inculcate experience of field personnel.

Elements of Artificial Intelligence (AI)

The AI may include active learning. Thus, the system may learn from the data and model complex phenomena and build an intuition for it. The system may also be able to predict what is going to happen. The system may also provide recommended actions. The system may also perform contextual adaptation. More particularly, the system may apply learning from one entity (e.g., a well) and apply it to another entity (e.g., another well). When a new scenario is encountered, the system may look into the past to find the best course of action at that time.

In an example, in the first phase, an automated system for production forecasting may be built. Intelligence and automation may be embedded in one of the workflows for production and improve efficiency/effectiveness of the production engineers. The system may start to understand complex data, understand outliers, bad (i.e., inaccurate) sensor data, flow regimes, and events and also build its predictive capability.

The system may also have the potential to improve production operations. The second phase focuses on hybridizing engineering models through AI and leveraging engines to help operators make meaningful decisions, optimize operations, and make better decisions. In this wave, the AI system may make progress on the elements by learning more about well characteristics, predict where the sweet spot is, which stage(s) should be re-fracked, suggest where the new well should be placed, and build more intelligence around what is the best action on the well.

The third phase may build it into a completely autonomous oilfield advisor. To build a completely self-learning system, the system and method may use training data and training of a large number of intelligent components.

The system and method disclosed herein may reshape the way production problems are solved. As the system and method evolve, they may help reduce cost and increase production and uptime. By understanding reservoirs and the subsurface better, knowing the production potential with more certainty, modeling drivers of well performance, predicting the impact of interventions in advance, the user can better design surface facilities and optimize decision and actions taken on the surface.

Figure 5:
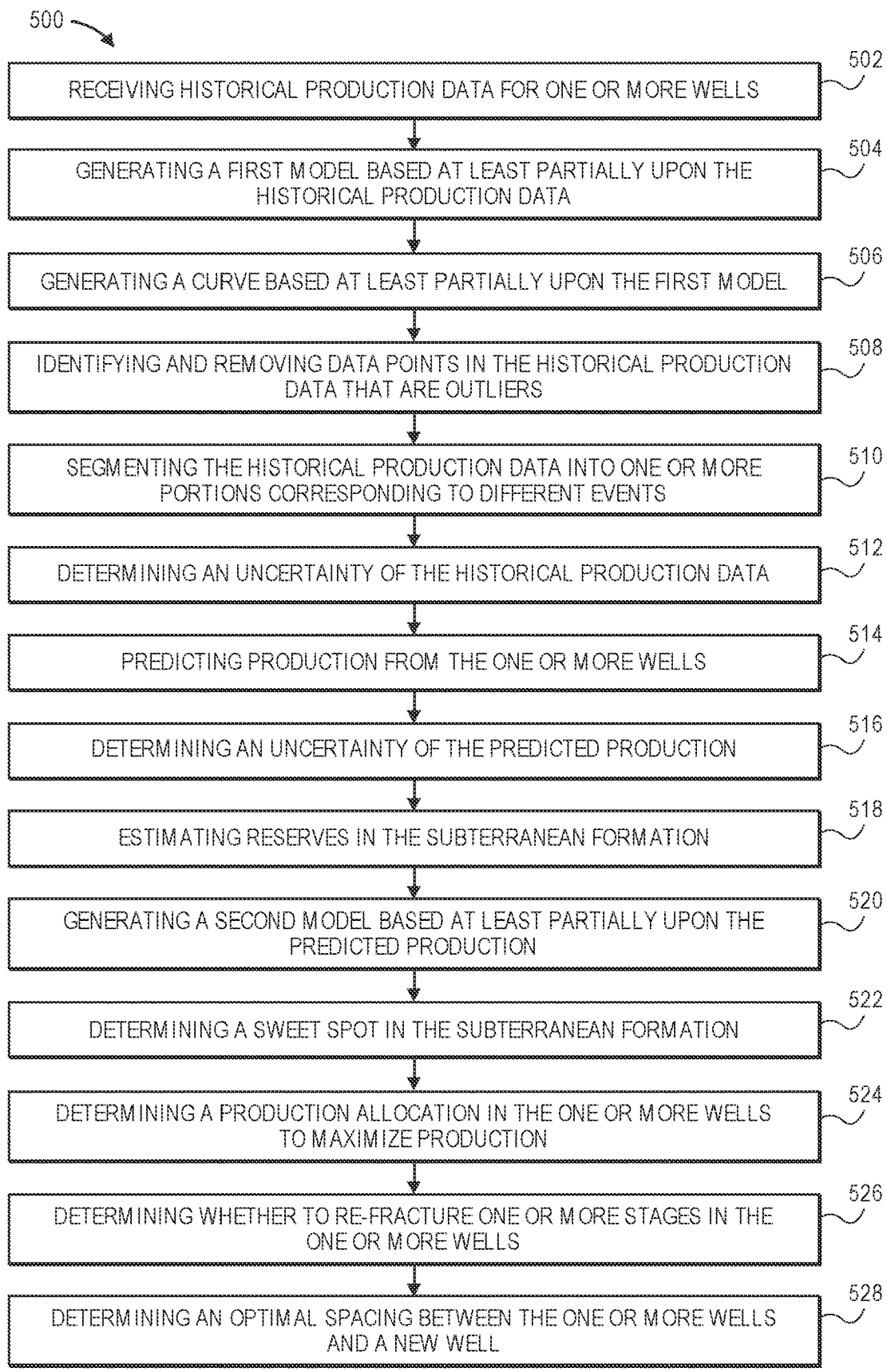
FIG. 5 illustrates a flowchart of a method for optimizing oil production, according to an embodiment.

FIG. 5 illustrates a flowchart of a method 500 for optimizing oil production, according to an embodiment. The method 500 may include receiving historical production data for one or more wells, as at 502. This is shown in FIG. 3A. As described above, the historical production data may describe the production rate (e.g., of oil and/or gas) over time from the one or more wells. The historical production data may include a plurality of data points, each at a different time. For example, each data point may correspond to production during a particular hour, day, week, etc. The historical production data may be measured/captured by sensors placed at wellhead controllers measuring the production rate. Water cut meters/sensors may also be used which measure the water cut of the flowing oil. Knowing the water cut and total production, the amount of oil and water produced may be calculated. The data goes into the data acquisition systems, the models may be built using the data stored in databases within the data repositories.

The method 500 may also include generating a first model using the historical production data, as at 504. The first model may be generated by using statistical modeling techniques to fit a non-linear parametric model to the historical production data. The method 500 may also include generating a curve 312 using the first model, as at 506. The curve may correspond to the historical production data. This is also shown in FIG. 3A. The curve 312 may be generated by using a non-linear parametric fit of the historical production data that is closest to the actual data behavior.

The method 500 may also include identifying and removing data points in the historical production data that are outliers 314 (e.g., with respect to the curve 312), as at 508. This is also shown in FIG. 3A. This may include removing any data points that are more than a predetermined distance from the curve 312. In at least one embodiment, the first model and/or the curve 312 may be generated (or regenerated) using the remaining data points after the outliers 314 are removed.

The method 500 may also include segmenting the historical production data into one or more portions 322, 324 corresponding to different events (e.g., workovers), as at 510. This is shown in FIG. 3B. This may occur after the data points 314 are removed. The segmenting may help the user understand when the well that was undergoing natural or uninterrupted production decline had workover operations performed on it that caused production to increase. By isolating the production history into different workover events, the user may better understand when the latest workover event occurred, fit the curve 312, and/or predict the future production using the historical production data from the last (i.e., most recent) workover event. The method 500 may also include determining an uncertainty of the historical production data, as at 512. The uncertainty may be determined based at least partially upon the first model. In at least one embodiment, confidence bands (e.g., $10^{th}$ percentile-$90^{th}$ percentile) may be used to determine the uncertainty estimates of the historical production data.

The method 500 may also include predicting production from the one or more wells (e.g., in the future), as at 514. The production may be predicted based at least partially upon the historical production data (e.g., after the outliers are removed), the first model, the events that occurred during the history, and/or the uncertainty of the historical production data. In one embodiment, the first model may be a cure fit model that is used to predict the future production.

The method 500 may also include determining an uncertainty of the predicted production, as at 516. The uncertainty of the predicted production may be determined based at least partially upon the first model, the uncertainty of the historical production data, and/or the predicted production.

The method 500 may also include estimating reserves in the subterranean formation, as at 518. The reserves may be estimated based at least partially upon the first model, the predicted production, and/or the uncertainty of the predicted production. Estimating the reserves may include determining overall production potential of the well from first day of production to the end of life of the well. Then, EUR estimates may be determined based at least partially upon the historical production data and the predicted production.

The method 500 may also include generating a second model based at least partially upon the predicted production, as at 520. In at least one embodiment, the second model may also be generated based at least partially upon the historical production data (e.g., after the outliers are removed), the first model, the events that occurred during the history, the uncertainty of the historical production data, the uncertainty of the predicted production, and/or the estimated reserves.

In at least one embodiment, the second model may also be generated based at least partially upon static data, dynamic data, and/or operating constraints. The static data may be or include reservoir properties such as rock and fluid properties, porosity, permeability, and compressibility. The dynamic data may be or include petrophysical properties such as resistivity, density, and reservoir properties (e.g., pressure). The dynamic data may be part of one or more well logs. The static data and/or the dynamic data may be captured by a downhole tool in one of the wells (e.g., a measurement-while-drilling (MWD) tool or a logging-while-drilling (LWD) tool), or captured at the surface. The operating constraints may be or include (e.g., production) tubing diameters, choke pressures, rates of water injection (e.g., into the wells), motor current in cases of wells with an artificial lift.

The method 500 may also include determining a sweet spot in the subterranean formation, as at 522. The sweet spot may be determined at least partially based upon the second model. In one example, the sweet spot may be determined by using spatial locations of zones with producible oil. This can be determined by modeling the historical production of the one or more wells in a basin, the completions design, the geophysical properties, and/or the geological maps.

The method 500 may also include determining a production allocation in the one or more wells to optimize/maximize (e.g., oil) production, as at 524. Determining how to allocate production may be based at least partially upon the second model and/or the location of the sweet spot. The allocation may be determined by using surface production measured across oil and water and back-calculating it to determine the production across zones of interest. For example, as described above with respect to FIG. 4B, the well 420 may include one or more stages 422A, 422B, and the production may be allocated between the stages 422A, 422B (e.g., 80% from the first stage 422A and 20% from the second stage 422B). The production may be allocated to maximize production from one particular well or to maximize an aggregate production from a plurality of wells, and the allocations selected for these two options may be different. The allocation may be physically performed (i.e., implemented) by selecting the best completion design to produce from the zone of interest. In another embodiment, the allocation may be physically performed by running and setting one or more plugs in the well and/or actuating one or more valves.

The method 500 may also include determining whether to re-fracture one or more stages in the one or more wells, as at 526. This may be shown in FIG. 4C. The determination of which stage(s) to re-fracture may be based at least partially upon the second model, the location of the sweet spot, and/or the production allocation. By modeling the production behavior of the wells and their frac stages during the first fracking cycle, knowing the completion design and the reservoir's drainage area, the machine learning model may learn the characteristics of each zone, and the model can then be used in time to predict the performance during or after re-fracking. The one or more wells may be physically re-fractured, in response to block 526, by injecting pressurized fluid into the one or more wells.

The method 500 may also include determining an optimal spacing between the one or more wells and a new well, as at 528. The optimal spacing may be based upon the second model, the location of the sweet spot, the production allocation, and/or the re-fracturing. The spacing may be optimal when it is such that none of the sweet spots or producible zones are left undrained. However, at the same time, the spacing between two wells may be such that these wells do not interfere with each other's producible zones. The new well may be drilled in response to block 524. More particularly, a downhole tool may drill the new well, and the downhole tool may be steered such that a trajectory of the new well maintains the optimal spacing.

Figure 6:
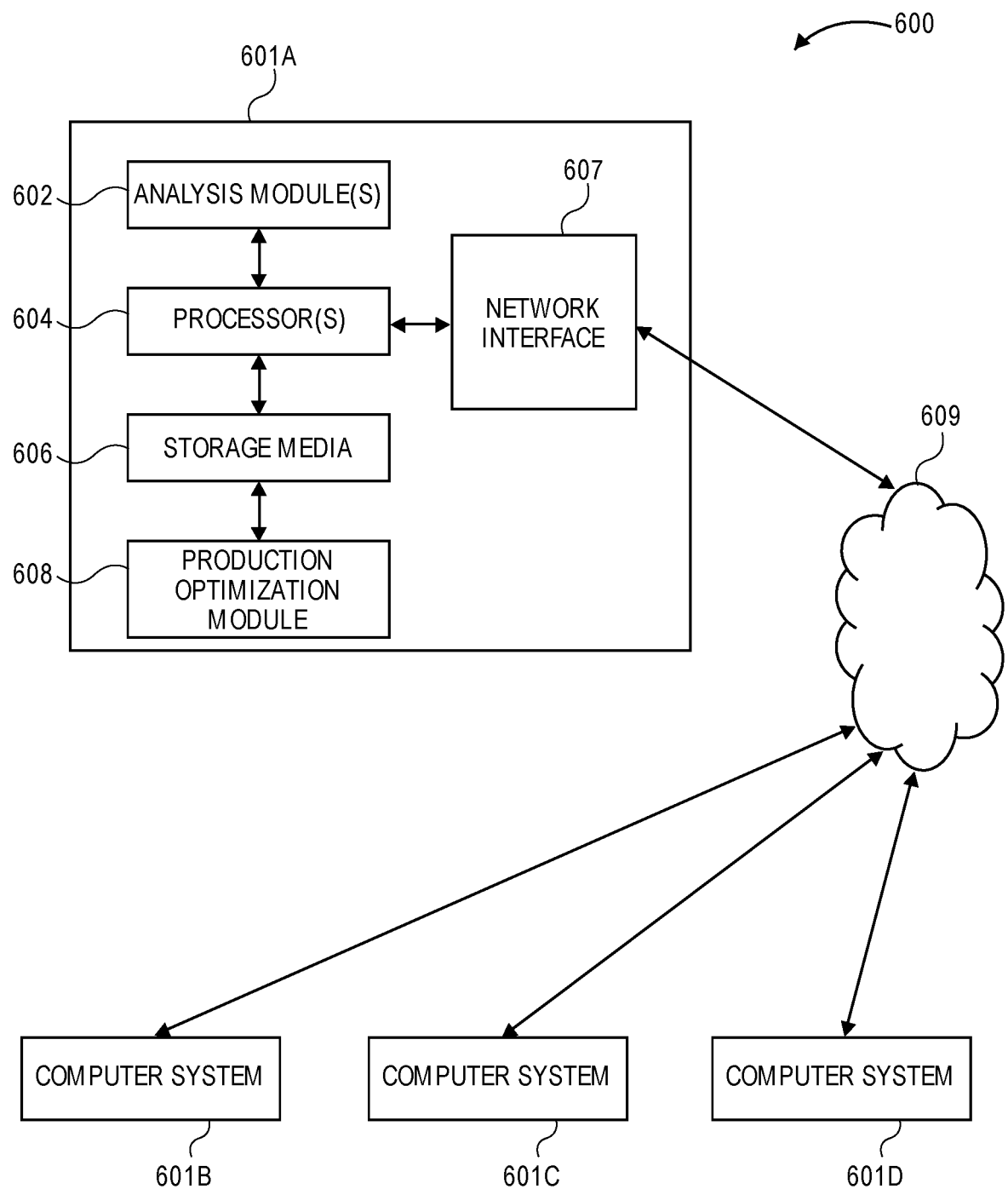
FIG. 6 illustrates an example of a computing system for performing at least a portion of the method, in accordance with some embodiments.

FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis module(s) 602 configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606 can be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or in another embodiment, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 600 contains one or more production optimization module(s) 608. In the example of computing system 600, computer system 601A includes the production optimization module 608. In some embodiments, a single production optimization module may be used to perform at least some aspects of one or more embodiments of the method 500. In other embodiments, a plurality of production optimization modules may be used to perform at least some aspects of the method 500.

It should be appreciated that computing system 600 is one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for optimizing oil production, comprising:
receiving historical production data for one or more wells;
generating a first model based at least partially upon the historical production data;
generating a curve based at least partially upon the first model, wherein the curve corresponds to the historical production data;
identifying and removing one or more data points in the historical production data that are outliers with respect to the curve;
determining an uncertainty of the historical production data based at least partially upon the first model after the one or more data points are removed;
predicting production in the one or more wells based at least partially upon the first model and the uncertainty of the historical production data;
determining an uncertainty of the predicted production based at least partially upon the predicted production and the uncertainty of the historical production;
generating a second model based at least partially on the predicted production and the uncertainty of the predicted production;
determining a production allocation in the one or more wells to maximize production based at least partially upon the second model; and
causing the production allocation to be implemented by fracturing or re-fracturing the one or more wells.

2. The method of claim 1, further comprising re-generating the first model, the curve, or both after the outliers have been removed.

3. The method of claim 1, further comprising segmenting the historical production data into one or more portions corresponding to different events.

4. The method of claim 1, wherein determining the uncertainty of the predicted production is also based at least partially upon the first model.

5. The method of claim 4, further comprising estimating a reserve in a subterranean formation in which the one or more wells are formed based at least partially upon the predicted production and the uncertainty of the predicted production.

6. The method of claim 1, further comprising determining a sweet spot in a subterranean formation in which the one or more wells are formed based at least partially upon the second model, wherein the production allocation is determined based at least partially upon the sweet spot.

7. The method of claim 1, wherein causing the production allocation to be implemented also comprises setting a plug in the one or more wells.

8. The method of claim 1, wherein fracturing or re-fracturing the one or more wells is based at least partially upon the second model.

9. A computing system, comprising:
one or more processors; and
a memory system comprising one or more non-transitory computer-readable media storing instructions that, when executed by at least one of the one or more processors, cause the computer system to perform operations, the operations comprising:
receiving historical production data for one or more wells;
generating a first model based at least partially upon the historical production data;
generating a curve based at least partially upon the first model, wherein the curve corresponds to the historical production data;
identifying and removing one or more data points in the historical production data that are outliers with respect to the curve;
determining an uncertainty of the historical production data based at least partially upon the first model after the one or more data points are removed;
predicting production in the one or more wells based at least partially upon the first model and the uncertainty of the historical production data;
determining an uncertainty of the predicted production based at least partially upon the predicted production and the uncertainty of the historical production;
generating a second model based at least partially on the predicted production and the uncertainty of the predicted production;
determining a production allocation in the one or more wells to maximize production based at least partially upon the second model; and
causing the production allocation to be implemented by setting a plug in the one or more wells.

10. The computing system of claim 9, wherein the second model is generated based at least partially upon static data, dynamic data, and operating constraints.

11. The computing system of claim 9, wherein the operations further comprise determining a sweet spot in a subterranean formation in which the one or more wells are formed based at least partially upon the second model, wherein the production allocation is determined based at least partially upon the sweet spot.

12. The computing system of claim 9, wherein the one or more wells comprise a plurality of wells, and wherein the production allocation maximizes an aggregate production of the plurality of wells.

13. The computing system of claim 9, wherein the operations further comprise re-fracturing a first of the one or more wells based at least partially upon the second model and the production allocation.

14. A non-transitory computer-readable media storing instructions that, when executed by one or more processors of a computer system, cause the computer system to perform operations, the operations comprising:
receiving historical production data for one or more wells;
generating a first model based at least partially upon the historical production data;
generating a curve based at least partially upon the first model, wherein the curve corresponds to the historical production data;
identifying and removing one or more data points in the historical production data that are outliers with respect to the curve;
determining an uncertainty of the historical production data based at least partially upon the first model after the one or more data points are removed;
predicting production in the one or more wells based at least partially upon the first model and the uncertainty of the historical production data;
determining an uncertainty of the predicted production based at least partially upon the predicted production and the uncertainty of the historical production;
generating a second model based at least partially on the predicted production and the uncertainty of the predicted production;

determining a production allocation in the one or more wells to maximize production based at least partially upon the second model; and causing the production allocation to be implemented by actuating a valve that is in communication with the one or more wells.

15. The non-transitory computer-readable media of claim 14, wherein the second model is generated based at least partially upon static data, dynamic data, and operating constraints.

16. The non-transitory computer-readable media of claim 14, wherein the operations further comprise determining a sweet spot in a subterranean formation in which the one or more wells are formed based at least partially upon the second model, wherein the production allocation is determined based at least partially upon the sweet spot.

17. The non-transitory computer-readable media of claim 14, wherein the one or more wells comprise a plurality of wells, and wherein the production allocation maximizes an aggregate production of the plurality of wells.

18. The non-transitory computer-readable media of claim 14, wherein the operations further comprise re-fracturing a first of the one or more wells based at least partially upon the second model and the production allocation.

* * * * *